United States Patent [19]

Anderson

[11] Patent Number: 4,990,244
[45] Date of Patent: Feb. 5, 1991

[54] RECYCLING THE COMPONENTS OF USED SINGLE USE HUMAN WASTE COLLECTING AND/OR ABSORBING PRODUCTS

[76] Inventor: Gene F. Anderson, 1622 S. 258th, Kent, Wash. 98032

[21] Appl. No.: 305,791

[22] Filed: Feb. 2, 1989

[51] Int. Cl.$^5$ ............................................. B07B 9/00
[52] U.S. Cl. ................................. 209/2; 134/26; 134/27; 209/3; 209/11; 209/12; 241/14; 241/DIG. 38
[58] Field of Search ............... 209/1, 2, 3, 11, 12, 209/235, 307, 681; 241/14, 20, 23, 24, 65, 79, 79.1, DIG. 38, 26, 27; 134/26, 27, 10, 11, 40, 42

[56] References Cited

U.S. PATENT DOCUMENTS

| | | | |
|---|---|---|---|
| 3,814,240 | 6/1974 | Laundrie | 209/2 X |
| 3,859,174 | 1/1975 | Taylor | 209/11 X |
| 3,890,220 | 6/1975 | Anderson | 209/3 |
| 4,034,862 | 7/1977 | Bahri et al. | 209/11 X |
| 4,303,501 | 12/1981 | Steffens | 209/2 |
| 4,305,507 | 12/1981 | Wittkopf | 209/3 |
| 4,332,677 | 6/1982 | Bubzich et al. | 209/3 |
| 4,500,040 | 2/1985 | Steffens | 241/24 |

Primary Examiner—Donald T. Hajec
Attorney, Agent, or Firm—Roy E. Mattern, Jr.

[57] ABSTRACT

Processes and apparatuses are provided for hygienically returning for reuse in subsequent manufacturing processes, the original liquid absorbing materials and moisture sealing materials of used single use collecting and/or absorbing products, previously worn by infants or adults to absorb urine and/or to collect feces. These human wastes are washed out from single use diapers, one use adult diapers, and other like purpose products, and directed into municipal sewer systems, or other systems ending in the treatment of sewage. These used single use collecting and/or absorbing products are heated to reach temperatures high enough to liquidize adhesives originally used, where necessary, to hold together the original liquid absorbing materials and moisture sealing materials, and then the liquidized adhesives are drained clear of these materials. Preferably, this removal of adhesives is completed during the washing of these one use products. Thereafter, the liquid absorbing materials and moisture sealing materials are separated from one another, for recycling to be used again in the manufacture of other products. Previously most of these used single use collecting and or absorbing products were tossed into the waste collection operation of municipalities, which generally ended in the filling of landfills. The human wastes, so deposited in landfills, via the annual use of eighteen billion single use diapers and other like single use products, threaten, or have affected underground water supplies and threaten, or have created other health problems.

26 Claims, 2 Drawing Sheets

RECYCLING THE COMPONENTS OF USED SINGLE USE HUMAN WASTE COLLECTING AND/OR ABSORBING PRODUCTS

BACKGROUND

Single use or one use human waste collecting and/or absorbing products have been used for several years. Now, annually, eighteen billion single use diapers are said to be tossed into the solid waste disposal systems. Many of these systems terminate at landfills. The deposited human wastes in these landfills, threaten or have affected underground water supplies, and threaten or have created other health problems. It is believed no recycling of these single use diapers or like products is being undertaken to recycle the liquid absorbing materials such as wood and corn pulps, or the moisture sealing materials, such as plastic, used in the manufacture of these single use products, and, in so doing, to wash the human wastes out of these single use products, and direct the human wastes into a municipal sewer system for treatment in a sewage plant.

In 1981, Bert Steffens, in his patent No. 4,303,501 recognized the value in recovering flock and/or cut absorbent materials and sheet coverings from discarded imperfectly manufactured hygiene articles or portions thereof, which previously were collected in a manufacturing plant and then thrown away. He described his process for the continuous separation of discarded, never used hygiene articles into their components, which were the flock and/or cut absorbent materials, and the sheet coverings. In his process, the factory discarded rejected hygiene articles were torn apart into large pieces. Thereafter, these large pieces were conducted over an oscillating sieve device having decreasing mesh width, with the smallest mesh width being so selected that the flocculent and/or cut absorbent material could still fall through, while the large pieces of torn covering were always carried off as sieve residues. Mr. Steffens was only concerned about recycling these clean manufacturing wastes.

SUMMARY

To eliminate the delivery of used single use diapers and/or used single use human waste collecting and/or absorbing products to landfills, and thereby to eliminate the posing of threats or the delivery of an unwanted disease and/or infection, often caused by a virus, in respect to underground water supplies by the presence of human wastes to nearby communities by the runoff of surface waters occurring during rain storms carrying human wastes, and to persons touching human waste while working during delivery of waste and/or in and around landfills, the described processes and apparatuses are used. They are utilized: to recycle the original sealing materials and the original liquid absorbing materials of these used single use human waste collecting and/or absorbing products; to deliver the human wastes to a municipal sewer system for further treatment in a sewage treatment plant; and to reduce the overall quantity of waste materials being delivered to landfills.

The described processes and apparatuses are directed:

to washing the human wastes clear of the used single use human waste collecting and/or absorbing products and delivering the human waste to a municipal sewer system;

to heating these products to a temperature high enough to liquidize the adhesives originally used, where necessary, to join the original liquid absorbing materials to the original sealing materials, and then to deliver the adhesive liquid to a municipal sewer system; and to separating the original liquid absorbing material from the original sealing materials for their recycling use in the manufacture of other products.

BRIEF DESCRIPTION OF THE DRAWINGS

Preferred embodiments of apparatus used in a preferred process are schematically illustrated in the drawing, wherein.

DESCRIPTION OF THE PREFERRED EMBODIMENTS

Eighteen billion single use diapers 10, containing human waste, are being yearly tossed away into municipal disposal systems, most of which terminate in a landfill. These diapers 10 and other human waste collecting and/or absorbing products 12, while being handled enroute to a dumping locale in a landfill pose a threat to the persons working with the collecting apparatuses and the transporting, dumping, and spreading machinery. Moreover, the dumped human waste collecting and/or absorbing products 12, containing human waste and placed in a landfill pose a threat to underground water supplies.

The process and the apparatus 14 described and schematically illustrated in three selected embodiments, in these three views of the drawings, if utilized eliminates the need for dumping human waste collecting and/or absorbing products 12, containing human waste, into a landfill. The threat of polluting underground water supplies because of human waste arriving in tossed away human waste and collecting and/or absorbing products 12 is thereby eliminated.

Figure 1:
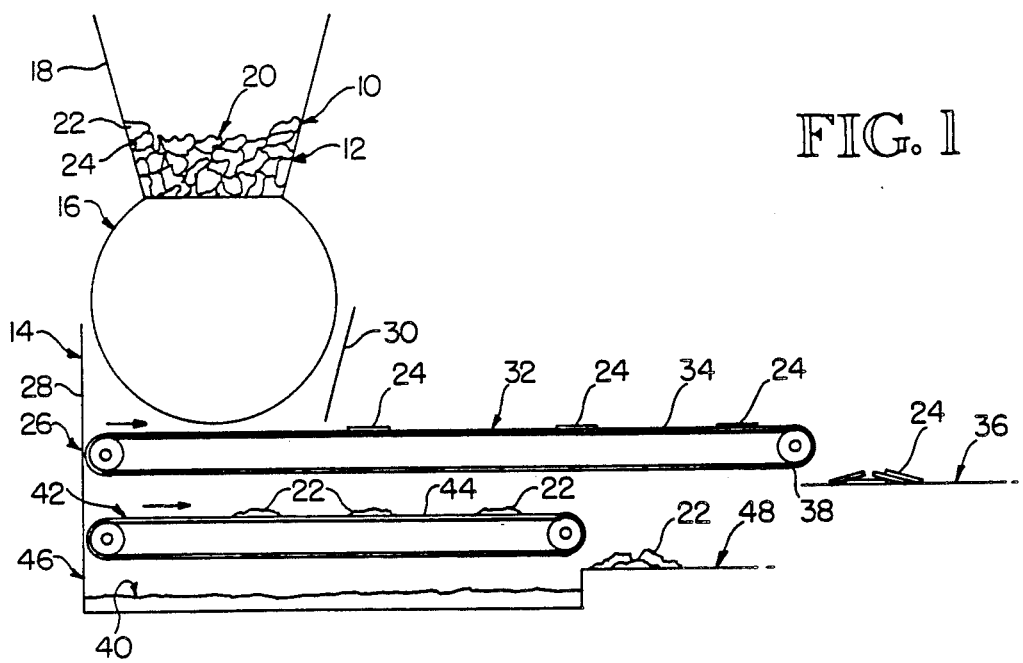
FIG. 1 illustrates how a hopper is used to receive a predetermined weight of used, single use diapers and/or other used single use human waste collecting products, then this predetermined weight of a group of such used single use products is lowered into a washing machine to separate out the human waste for delivery to a municipal sewer system, and by using hot enough water to also liquidize adhesives originally used, where necessary, to join portions of the original sealing materials to the original liquid absorbing materials of the single use human waste collecting products, and to rinse away the liquidized adhesives, and then these respective original materials are separated further and delivered to respective locales by the arrangement of conveyors, one having the agitated motion of a fine mesh conveyor belt for separating out and conveying the original sealing materials to one locale, and the other having a porous conveyor belt for separating out and conveying the original liquid absorbing materials to another locale, and at the selected different locales, these original materials are collected for delivery to be reused, i.e. recycled, for incorporation into other new products.

Tossed away single use diapers 10, containing human waste, are kept clear of other dwelling wastes and collected for pickup by persons, employed by a business such as a diaper service, and these persons may also be first delivering a supply of unused new single use diapers 10 to persons living in the dwelling. These collected and picked up used single use diapers 10 or other types of used human waste collecting and/or absorbing products 12, are delivered to the respective business where they are:

1. unloaded and gathered together;
2. preferably arranged into groups not exceeding a designated preselected weight;
3. loaded, in a selected weight group, into a washing machine 16, often using a hopper 18 to determine the group 20 of used single use diapers 10 and/or used human waste collecting and/or absorbing products 12, as shown in FIG. 1, of the drawing, which is a schematic view of a preferred embodiment;
4. washed to remove the human waste from the used single use diapers 10 and/or other used human waste collecting products 12;
5. heated to a temperature high enough to liquidize the adhesives used during the original manufacturing process to bond together, where necessary, the original liquid absorbing materials to the original moisture sealing materials;
6. the heat is preferably supplied via hot water supplied to the washing machine 16, and the liquidized adhesives leave the washing machine, via the previously heated hot water, which also carries away the human wastes, down a drain leading to a municipal drain, which in turn leads to a sewage processing plant of a municipal sewer system; and
7. separated into the original liquid absorbing materials 22 and the original moisture sealing materials 24 by using forces created by hand, gravity, and/or the operation of machinery 26;

A preferred embodiment of the separating apparatus 26 or machinery 26, is shown in FIG. 1. The separated materials 22, 24 are dropped down, between splash guards 28, 30, on to an agitated motion conveyor 32 having a fine mesh belt 34 the mesh size being selected up to one inch square per opening. The moisture sealing materials 24, which are generally made of plastic materials, remain on the fine mesh belt 34 for being conveyed away to a collection locale 36 at the discharge end 38 of the conveyor 32. The liquid absorbing materials 22 drop down through the fine mesh belt 34 of the agitated motion conveyor 32 being carried in part by the remaining water 40, which is leaving the washing machine, to reach a lower conveyor 42 having a porous belt 44. The draining water continues on to a receiving tank 46 which is eventually drained to a municipal sewage drain, or pumped into tanks on trucks. The separated liquid absorbing materials 22 referred to as pulp materials 22, and being derived from the wood of trees and/or from portions of a corn growing plant, are conveyed away to a collection locale 48.

The original sealing materials 24 are collected at locale 36, and the original liquid absorbing materials 22 are collected at locale 48, to be placed in containers for delivery to manufacturing plants which recycle these materials 22, 24, in creating new products.

Figure 2:
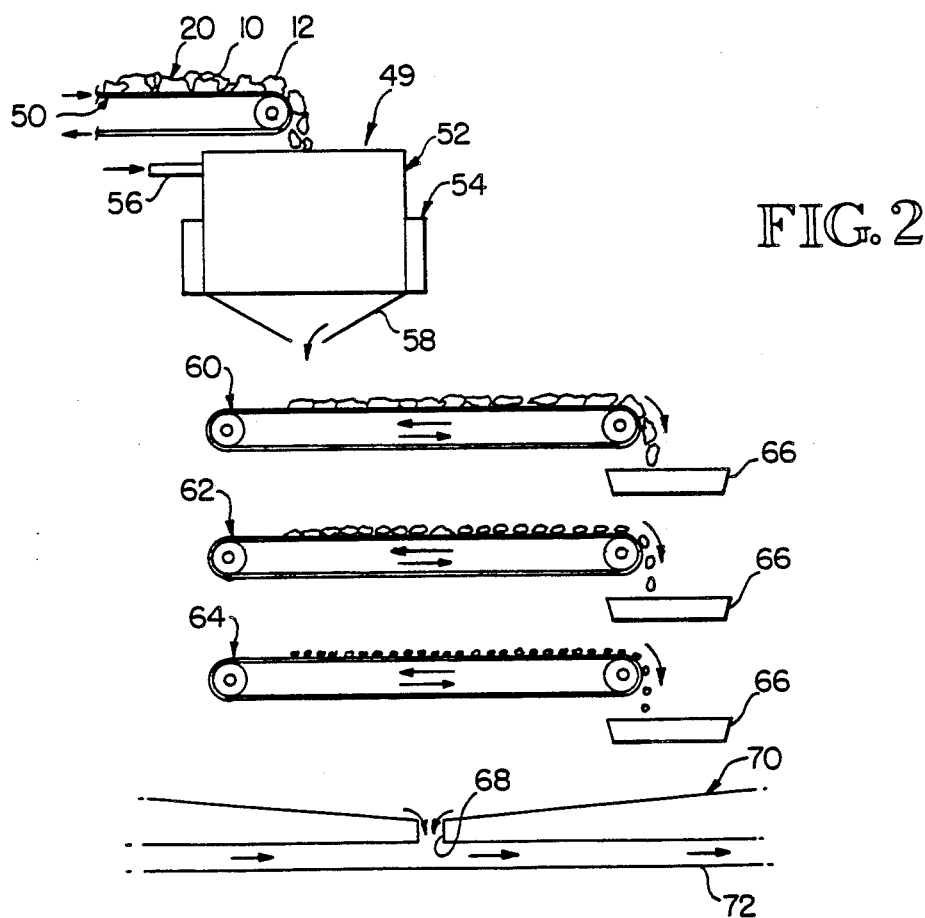
FIG. 2 illustrates schematically how conventional equipment is arranged in a selected embodiment to wash and heat, agitate, separate, and collect the respective products used in originally making single use human waste collecting products, while directing the spent adhesives, urine, and feces into a sewer.
Figure 3:
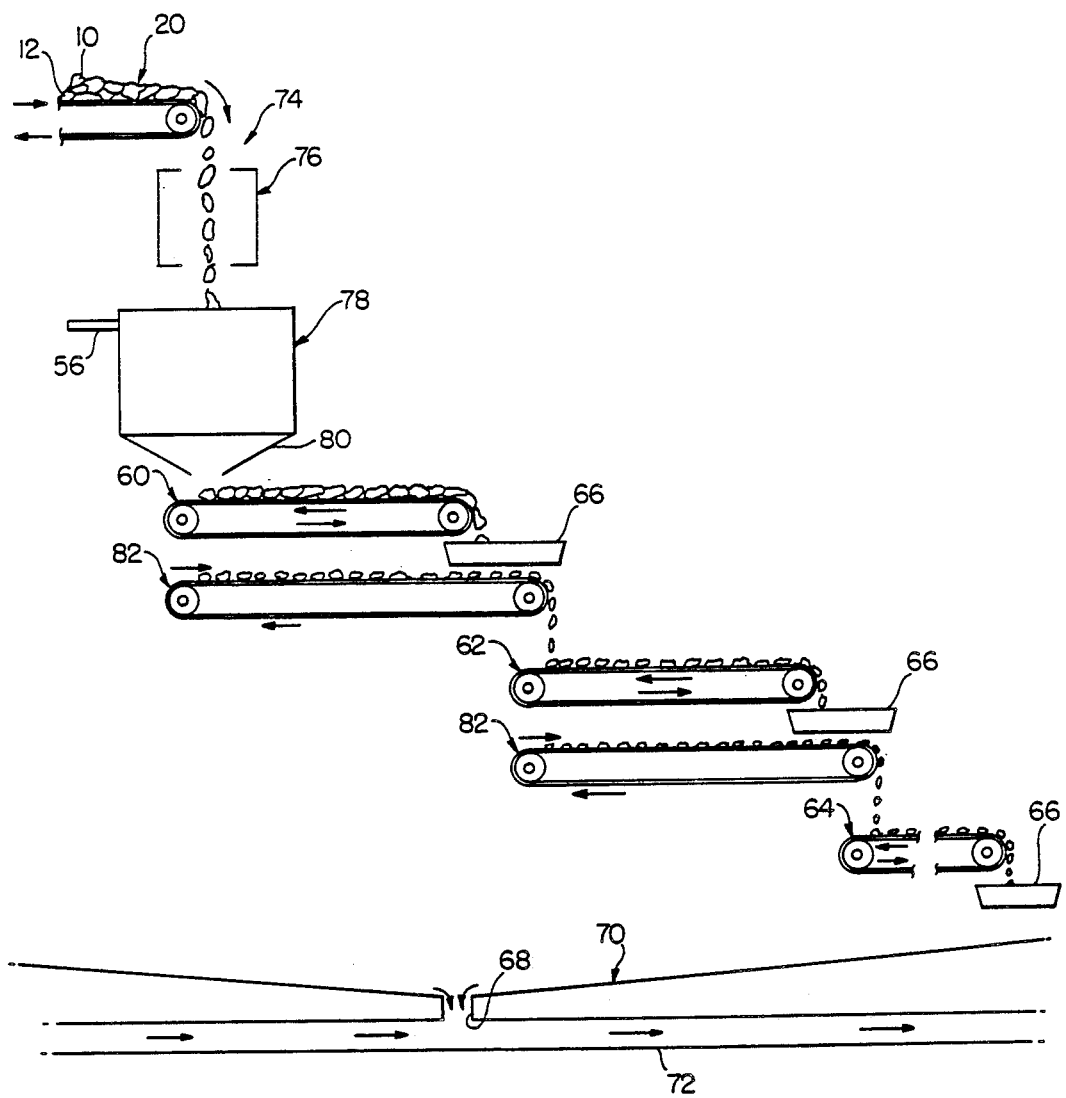
FIG. 3 illustrates schematically how conventional equipment is arranged in another selected embodiment to heat, wash, oscillate, separate, and collect the respective products used in originally making single use human waste collecting products, while directing the spent adhesives, urine, and feces into a municipal sewer.

Other arrangements, such as shown in FIGS. 2 and 3, and others not shown, are used in reference to different washing machinery, and to different heating equipment, such as radiant heating, steam heating, convection air heating, wherein the air is heated by burning fuels, or by operating electrical heaters. In respect to separating equipment, an oscillating sieve, or a group of oscillating sieves arranged one above the other and/or a group of oscillating sieves arranged in succession, with accompanying collecting conveyors, are used in separating the original liquid absorbing material 22 from the original sealing material 24.

In the arrangement of apparatus 49, as illustrated in FIG. 2, a group 20 of single use diapers 10 and/or other human waste collecting products 12 are delivered by a delivery conveyor 50 to a top loading washing machine 52, surrounded by a heater 54. Cleaning water enters at the top entry 56 and eventually the rinsed products 20 and the cleaning water depart through a bottom drain 58. The heating is accomplished by using either heating fuels or electricity to heat water for its circulation, or going up in temperature to create steam, and thereafter utilizing convection and/or radiation transfer of heat via the steam heat.

Below the bottom drain 58 are three spaced tiers of oscillating separators 60, 62, 64, one above the other, each having an oscillating power source, not shown. The top oscillating separator 60 has a larger mesh size, the middle oscillating separator 62 has a medium mesh size, and the bottom oscillating separator has a smaller mesh size.

At the delivery end of each oscillating separator is a collector 66 to receive portions of respective groups of sizes of respective components derived from the original used group 20 of products 10 and/or 12. The cleaning water and possible smaller particle sizes derived from the group 20, which pass through even the smaller mesh size of the oscillating separator 64, pass through the bottom drain 68 in a floor 70, or floor like structure, to thereafter enter a discharge pipe 72, such as a sewer pipe. If necessary, an additional filtering apparatus, not shown, is utilized to remove these smaller particles, before the cleaning water, now soiled and carrying waste, enters the bottom drain 68.

In the arrangement of apparatus 74, as illustrated in FIG. 3, a group 20, of single use diapers 10 and/or other human waste collecting products 12, are delivered and passed through a heater 76, using a selected heat source considered to be the most economical at the site where this apparatus 74 is installed. The heated group 20 thereafter enters a washing unit 78, supplied with cleaning water through water entry 56. Following the washing, the group 20 and the cleaning water depart from the washing unit 78, via the drain 80 thereof, to reach the top oscillating separator 60 having the larger mesh size. The larger particle sizes of the original group 20 leaving this oscillating separator 60 are gathered in the first collector 66.

The smaller particle sizes which pass down through the larger mesh size reach a conveyor 82, and are carried to another middle oscillating separator 62 having a medium mesh size. The next size particle sizes of the original group 20 leaving this oscillating separator 62 are gathered in the second collector 66. The smaller particle sizes which pass down through the medium mesh size reach the conveyor 82, and are carried to another bottom oscillating separator 64 having the smaller mesh size. The next size particle sizes of the original group 20 leaving this oscillating separator 64 are gathered in the third collector 66.

The smaller particle sizes which pass down through the small mesh size reach the floor 70 to be washed down the drain 68. If necessary, an additional filtering apparatus, not shown, is utilized to remove these smaller particles, before the cleaning waters, now soiled with waste, enter the bottom drain 68.

In the method steps of all the embodiments of the process, and using all the embodiments of the apparatuses as shown and others not shown, the main purpose is to keep the used one use human waste collecting products 12, such as used single use diapers 10, out of the municipal refuse collecting systems, which otherwise would deliver these used one use human waste collecting products to landfills, posing a threat of disease or infections being carried in underground water supplies, and to be possibly carried away by surface waters to nearby communities, and/or to be possibly lodged in landfill touched by persons working in and around the landfill, thereby spreading an unwanted disease and/or infection, often caused by a virus, to many people.

I claim:

1. A process for hygienically returning for reuse, in subsequent manufacturing processes, substantially most of the original liquid absorbing materials and moisture sealing materials originally secured together by adhesives of used one use collecting and absorbing products, previously manufactured and then used to collect human waste, which includes urine and feces, comprising:

(a) gathering the used collecting and absorbing products containing human waste;

(b) arranging the used collecting and absorbing products containing human waste, into overall groups not exceeding a designated preselected weight;

(c) loading a selected overall group of used collecting and absorbing products containing human waste, into machinery, which utilizes water for soaking and washing the selected overall group, to remove the human waste and to divert the human waste, via water leaving the machinery, into municipal sewers for subsequent municipal sewer treatment;

(d) operating this machinery for soaking and washing to remove the human waste from the selected overall group of used collecting and absorbing products;

(e) heating the washed selected overall group of used collecting and absorbing products to a temperature high enough to liquidize the adhesives used during the original manufacturing process to bond together the original liquid absorbing materials to the original moisture sealing materials;

(f) withdrawing the liquidized adhesives from the original liquid absorbing materials and the original moisture sealing materials; and (g) separating the original liquid absorbing materials and the original moisture sealing materials, from one another.

2. A process, as claimed in claim 1, wherein the heating to a temperature high enough to liquidize the adhesives is undertaken by heating the water to this high enough temperature, which is circulated in the machinery, which is operated to remove the human waste from the used collecting and absorbing products.

3. A process, as claimed in claim 1, wherein the heating to a temperature high enough to liquidize the adhesives is undertaken by heating directly the washed used collecting and absorbing products.

4. A process, as claimed in claim 3, wherein the heating directly of the washed used collecting and absorbing products is heating via convected heating air.

5. A process, as claimed in claim 3, wherein the heating directly of the washed used collecting and absorbing products is heating by the radiation of heat.

6. A process, as claimed in claim 4, wherein the heating, via convected heating air, is undertaken by burning fuels to heat the convected air.

7. A process, as claimed in claim 4, wherein the heating, via convected heating air, is undertaken by operating electric heaters to heat the convected air.

8. A process, as claimed in claim 3, wherein the heating directly of the washed used collecting and absorbing products is heating by using steam.

9. A process, as claimed in claim 3, wherein the heating directly of the washed used collecting and absorbing products is heating by using hot water.

10. A process, as claimed in claim 1, wherein the separating of the original liquid absorbing materials and the original moisture sealing materials from one another, is undertaken by the operation of an agitated conveyor.

11. A process, as claimed in claim 1, wherein the separating of the original liquid absorbing materials and the original moisture sealing materials, from one another, is undertaken by the operation of relatively positioned conveyors having a top agitated conveyor utilizing a mesh conveyor belt to receive both the moisture sealing materials and liquid absorbing materials and water contained therein, and a lower conveyor, utilizing a porous conveyor belt to receive the liquid absorbing materials and water contained therein that is passing down through the mesh conveyor belt, and then water, formerly contained int he liquid absorbing materials, passes down through the porous conveyor belt for collection.

12. A process, as claimed in claim 1, wherein the separating of the original liquid absorbing materials and the original moisture sealing materials, from one another is undertaken, by the operation of an oscillating sieve.

13. A process, as claimed in claim 1, wherein the loading of a selected overall group of used collecting and absorbing products, containing human waste, into machinery which utilizes water for soaking and washing is undertaken by providing and loading a hopper which in turn is emptied by lowering these used collecting and absorbing products into the machinery for soaking and washing.

14. A process, as claimed in claim 13, wherein, following the operating of the machinery to remove the human waste, and following the heating of the used collecting and absorbing products, and following the withdrawing of the liquidized adhesives, the separating of the original liquid absorbing materials and the original moisture sealing materials from one another, by using forces created by the operation of machinery, involves the operation of an agitated conveyor.

15. A process, as claimed in claim 14, wherein the operation of the machinery involves not only the operation of the agitated conveyor, having a mesh conveyor belt to receive the moisture sealing materials, but also the operation of a lower conveyor, having a porous conveyor belt to receive the liquid absorbing materials passing down through the mesh conveyor belt, and water originating in the liquid absorbing materials passes down through the porous conveyor belt for collection.

16. A process, as claimed in claim 13, wherein following the operating of the machinery to remove the human waste, and following the heating of the used collecting and absorbing products, and following the withdrawing of the liquidized adhesives, the separating of the original liquid absorbing materials and the original moisture sealing materials from one another, by using forces created by the operation of machinery, involves the operation of an oscillating sieve.

17. A process, as claimed in claim 16, wherein additional like operating oscillating sieves are arranged one above the other.

18. A process, as claimed in claim 16, wherein additional like operating oscillating sieves are arranged in succession, and undersized materials passing down through the oscillating sieve are led to the subsequent oscillating sieve via a conveyor.

19. A process, utilized to keep used disposable human waste collecting products originally secured together by adhesives, from being put into a toss out, collecting, pick up transport, and landfill dumping, sequential waste disposal routine, wherein substantially most of the original liquid absorbing materials, and the original moisture sealing materials are hygienically processed for return to be reused in subsequent manufacturing processes, comprising:
  (a) gathering the otherwise to be tossed out, used disposable human waste collecting products, containing human waste;
  (b) loading the gathered used disposable human waste collecting products, containing human waste, into machinery, utilizing water for washing, to remove the human waste via draining the water and the human waste into municipal sewers for subsequent municipal sewer treatment;
  (c) operating this machinery to remove the human waste from the used disposable human waste collecting products;
  (d) heating the used disposable human waste collecting products, that are washed, to a temperature high enough to liquidize the adhesives used during the original manufacturing process to bond together the original liquid absorbing materials to the original moisture sealing materials;
  (e) withdrawing the liquidized adhesives from the original liquid absorbing materials and the original moisture sealing materials;
  (f) separating the original liquid absorbing materials and the original moisture sealing materials from one another; and
  (g) collecting in separate places the respective recovered original liquid absorbing materials and the original moisture sealing materials, in readiness for their recycling into other products to be manufactured.

20. Apparatus, for hygienically treating used collecting and absorbing products, previously manufactured and secured together by adhesives, and then worn by infants or adults to absorb urine and to collect feces, and then for separating the original liquid absorbing materials and moisture sealing materials, previously adhered together in these used collecting and absorbing products, comprising:
  (a) a washing machine filled with washing water and connected to a municipal sewer to receive and to wash the collecting and absorbing products, thereby removing the urine and feces via the draining of the washing water and the urine and feces into a municipal sewer for further processing of the urine and feces;
  (b) a heating means to heat the collecting and absorbing products, to liquidize the adhesives used during the original manufacturing process to bond together the original liquid absorbing materials to the original moisture sealing materials, so the liquidized adhesives will drain clear of these materials; and
  (c) a separating machine to collect the original moisture sealing materials at one locale and to collect the original liquid absorbing materials at another locale.

21. Apparatus, as claimed in claim 20, comprising, in addition, a hopper for collecting a selected quantity of used collecting and absorbing products, before they are received within a washing machine.

22. Apparatus, as claimed in claim 20, wherein the separating machine is an agitated conveyor having a fine mesh belt to receive the washed and heated collecting and absorbing product.

23. Apparatus, as claimed in claim 22, having, in addition, a lower conveyor, utilizing a porous conveyor belt, to receive the liquid absorbing materials passing down through the fine mesh belt of the agitated conveyor, and separating water passes down through the porous conveyor belt for collection.

24. Apparatus, as claimed in claim 20, wherein the separating machine has an oscillating sieve component.

25. Apparatus, as claimed in claim 24, wherein additional like oscillating sieve components are arranged one above the other.

26. Apparatus, as claimed in claim 24, wherein additional like oscillating sieve components are arranged in succession, and undersized materials passing through the sieve components are carried to the subsequent oscillating sieve component via a conveyor, there being a conveyor below each sieve component.

* * * * *